United States Patent
Bian

(10) Patent No.: US 11,947,168 B2
(45) Date of Patent: Apr. 2, 2024

(54) STACKED EDGE COUPLERS IN THE BACK-END-OF-LINE STACK OF A PHOTONIC CHIP

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 115 days.

(21) Appl. No.: 17/658,092

(22) Filed: Apr. 5, 2022

(65) Prior Publication Data
US 2023/0314708 A1    Oct. 5, 2023

(51) Int. Cl.
G02B 6/30 (2006.01)
G02B 6/12 (2006.01)
G02B 6/122 (2006.01)

(52) U.S. Cl.
CPC ......... *G02B 6/305* (2013.01); *G02B 6/12004* (2013.01); *G02B 6/1228* (2013.01); *G02B 2006/12147* (2013.01); *G02B 2006/12166* (2013.01)

(58) Field of Classification Search
CPC ................................. G02B 6/30; G02B 6/305
See application file for complete search history.

(56) References Cited

U.S. PATENT DOCUMENTS

| | | | |
|---|---|---|---|
| 9,618,699 B2 * | 4/2017 | Tummidi | G02B 6/107 |
| 10,126,500 B2 | 11/2018 | Qi et al. | |
| 10,197,731 B2 | 2/2019 | Teng et al. | |
| 11,378,743 B1 | 7/2022 | Bian et al. | |
| 11,487,059 B2 | 11/2022 | Sahin et al. | |
| 11,567,261 B2 | 1/2023 | Bian et al. | |
| 11,662,523 B2 | 5/2023 | Bian et al. | |
| 2016/0356960 A1 * | 12/2016 | Novack | G02B 6/1228 |
| 2017/0017034 A1 | 1/2017 | Painchaud et al. | |

(Continued)

FOREIGN PATENT DOCUMENTS

| | | | |
|---|---|---|---|
| CN | 210626707 U | * | 5/2020 |
| CN | 214503949 U | * | 10/2021 |
| JP | 5-142435 A | * | 6/1993 |

OTHER PUBLICATIONS

M.M. Sisto et al. Novel spot size converter for coupling standard single mode fibers to SOI waveguides. Proceedings of SPIE vol. 9752, Silicon Photonics XI; 975217, Mar. 2016. (https://doi.org/10.1117/12.2230739) (Year: 2016).*

(Continued)

*Primary Examiner* — Michael Stahl
(74) *Attorney, Agent, or Firm* — Anthony Canale

(57) ABSTRACT

A stacked edge coupler for a photonic chip is provided. The stacked edge coupler includes an insulating layer, a waveguide core, a first assisting waveguide, and a back-end-of-line stack. The first assisting waveguide is on the insulating layer. The waveguide core is over the first assisting waveguide and includes a tapered section. The back-end-of-line stack is over the waveguide core. The back-end-of-line stack includes a side edge, a dielectric layer, and a second assisting waveguide. The second assisting waveguide is on the dielectric layer and arranged adjacent to the side edge. The second assisting waveguide has an overlapping arrangement with the tapered section of the waveguide core.

19 Claims, 9 Drawing Sheets

(56) References Cited

U.S. PATENT DOCUMENTS

| | | | |
|---|---|---|---|
| 2019/0154919 A1 | 5/2019 | Teng et al. | |
| 2019/0227230 A1* | 7/2019 | Novack | G02B 6/124 |
| 2019/0391336 A1* | 12/2019 | Wong | G02B 6/305 |
| 2022/0229250 A1* | 7/2022 | Bian | G02B 6/0046 |
| 2022/0260775 A1* | 8/2022 | Bruck | G02B 6/12002 |
| 2023/0061568 A1* | 3/2023 | Hsu | G02B 6/12002 |

OTHER PUBLICATIONS

Pavel Cheben et al., Refractive index engineering with subwavelength gratings for efficient microphotonic couplers and planar waveguide multiplexers, Optics Letters, 2010, pp. 2525-2528, vol. 35—No. 15, Optica Publishing Group.

Barwicz et al., An O-band Metamaterial Converter Interfacing Standard Optical Fibers to Silicon Nanophotonic Waveguides, 2015 Optical Fiber Communications Conference and Exhibition (OFC), 2015, pp. 1-3, IEEE.

Teng et al., Trident shape SOI metamaterial fiber-to-chip edge coupler, Optical Fiber Communication Conference (OFC) 2019, 2019, pp. 1-3, Optica Publishing Group.

Shang et al., Silicon nitride tri-layer vertical Y-junction and 3D couplers with arbitrary splitting ratio for photonic integrated circuits, Optics Express, May 2017, pp. 10474-10483, vol. 25—No. 9, Optics Express.

Tummidi et al., Multilayer Silicon Nitride based Coupler Integrated into a Silicon Photonics Platform with a 0.5dB Coupling Loss between Standard SMF and the As-Diced Chip Edge Facet, 2019 IEEE 16th International Conference on Group IV Photonics (GFP), Aug. 2019, pp. 1-2, IEEE.

Mu et al., Edge Couplers in Silicon Photonic Integrated Circuits: A Review, Applied Sciences, Feb. 2020, pp. 1-29, vol. 10—No. 1538, MDPI.

Papes et al., Fiber-chip edge coupler with large mode size for silicon photonic wire waveguides, Feb. 2016, pp. 1-13, vol. 24—No. 5, OSA.

Giewont et al., 300-mm Monolithic Silicon Photonics Foundry Technology, IEEE Journal of Selected Topics in Quantum Electronics, Oct. 2019, pp. 1-11, vol. 25, No. 5, IEEE.

Bian et al., 3D Integrated Laser Attach Technology on 300-mm Monolithic Silicon Photonics Platform, 2020 IEEE Photonics Conference (IPC), Nov. 2020, pp. 1-2, IEEE.

Bian et al., Monolithically integrated silicon nitride platform, 2021 Optical Fiber Communications Conference and Exhibition (OFC), 2021, pp. 1-3, IEEE.

Bian et al., Hybrid III-V laser integration on a monolithic silicon photonic platform, 2021 Optical Fiber Communications Conference and Exhibition (OFC), 2021, pp. 1-3, IEEE.

Peng et al., A CMOS Compatible Monolithic Fiber Attach Solution with Reliable Performance and Self-alignment, 2020 Optical Fiber Communications Conference and Exhibition (OFC), 2020, pp. 1-3, IEEE.

Bian et al., Towards low-loss monolithic silicon and nitride photonic building blocks in state-of-the-art 300mm CMOS foundry, OSA Technical Digest, 2020, pp. 1-2, Optica Publishing Group.

Rakowski et al., 45nm CMOS—Silicon Photonics Monolithic Technology (45CLO) for next-generation, low power and high speed optical interconnects, 2020 Optical Fiber Communications Conference and Exhibition (OFC), 2020, pp. 1-3, IEEE.

\* cited by examiner

STACKED EDGE COUPLERS IN THE BACK-END-OF-LINE STACK OF A PHOTONIC CHIP

TECHNICAL FIELD

The present disclosure relates generally to photonic chips, and more particularly to stacked edge couplers and methods of forming the same.

BACKGROUND

Photonic chips integrate optical components and electronic components into a single platform. The optical components may include, for example, waveguides, optical switches, couplers, and modulators. The electronic components may include, for example, field-effect transistors. The electronic components may be operatively coupled to the optical components for the functioning of the photonic chips.

An edge coupler is commonly used for coupling light of a given mode from a light source, such as a laser or an optical fiber, to the other optical components and/or electronic components on the photonic chip. As the light source is typically larger than the edge coupler, the edge coupler may be unable to fully confine the incident mode received and as a result, the edge coupler may exhibit significant power losses.

Therefore, solutions are provided to overcome, or at least ameliorate, the disadvantages described above.

SUMMARY

To achieve the foregoing and other aspects of the present disclosure, stacked edge couplers and methods of forming the same are presented.

According to an aspect of the present disclosure, a stacked edge coupler for a photonic chip is provided. The stacked edge coupler includes an insulating layer, a waveguide core, a first assisting waveguide, and a back-end-of-line stack. The first assisting waveguide is on the insulating layer. The waveguide core is over the first assisting waveguide and includes a tapered section. The back-end-of-line stack is over the waveguide core. The back-end-of-line stack includes a side edge, a dielectric layer, and a second assisting waveguide. The second assisting waveguide is on the dielectric layer and arranged adjacent to the side edge. The second assisting waveguide has an overlapping arrangement with the tapered section of the waveguide core.

According to another aspect of the present disclosure, a stacked edge coupler for a photonic chip is provided. The stacked edge coupler includes an insulating layer, a first assisting waveguide, a waveguide core, and a back-end-of-line stack. The insulating layer has a side edge. The first assisting waveguide is on the insulating layer and includes a tapered section having an end surface, and the end surface is substantially coplanar with the side edge of the insulating layer. The waveguide core is over the first assisting waveguide and includes a tapered section having a side edge, and the side edge of the tapered section is over the end surface of the first assisting waveguide. The back-end-of-line stack includes a side edge, a dielectric layer, a second assisting waveguide, a third assisting waveguide, and a fourth assisting waveguide. The fourth assisting waveguide is arranged laterally between the second assisting waveguide and the third assisting waveguide. The second assisting waveguide, the third assisting waveguide, and the fourth assisting waveguide are arranged on the interlayer dielectric layer adjacent to the side edge. The fourth assisting waveguide has an overlapping arrangement with the tapered section of the waveguide core.

According to yet another aspect of the present disclosure, a method of forming a stacked edge coupler for a photonic chip is provided. The stacked edge coupler includes forming a first assisting waveguide on an insulating layer and forming a waveguide core comprising a tapered section over the first assisting waveguide. A back-end-of-line stack is formed over the waveguide core, and the back-end-of-line stack includes a side edge, a dielectric layer, and a second assisting waveguide. The second assisting waveguide is formed on the dielectric layer adjacent to the side edge and has an overlapping arrangement with the tapered section of the waveguide core.

BRIEF DESCRIPTION OF THE DRAWINGS

The embodiments of the present disclosure will be better understood from a reading of the following detailed description, taken in conjunction with the accompanying drawings.

Figure 1A:
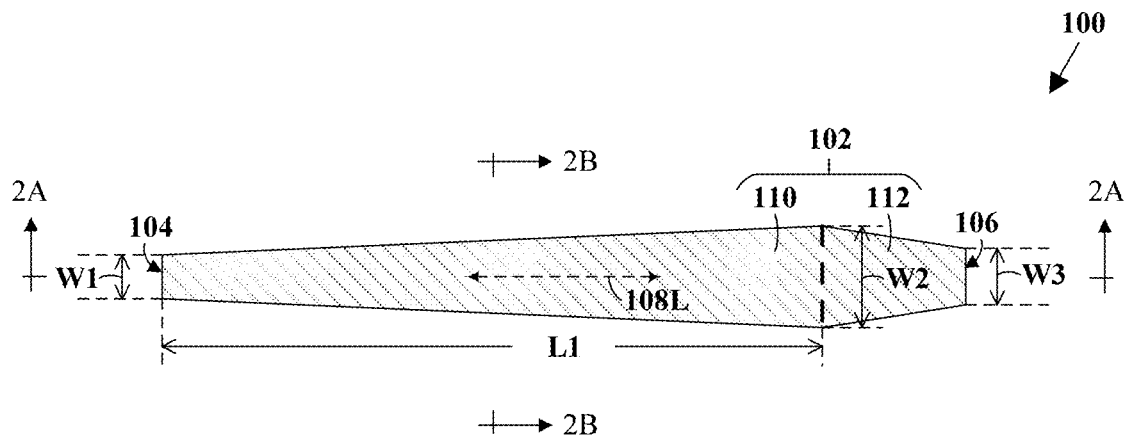
FIGS. 1A through 1C are exemplary top-down views of a stacked edge coupler of a photonic chip at an initial fabrication stage of a processing method, according to embodiments of the disclosure.

For simplicity and clarity of illustration, the drawings illustrate the general manner of construction, and certain descriptions and details of well-known features and techniques may be omitted to avoid unnecessarily obscuring the discussion of the described embodiments of the disclosure.

Additionally, features in the drawings are not necessarily drawn to scale. For example, the dimensions of some of the features in the drawings may be exaggerated relative to other features to help improve understanding of embodiments of the device. The same reference numerals in different drawings denote the same features, while similar reference numerals may, but do not necessarily, denote similar features.

DETAILED DESCRIPTION

The present disclosure relates generally to photonic chips, and more particularly to stacked edge couplers and methods of forming the same. Various embodiments of the present disclosure are now described in detail with accompanying drawings. It is noted that like and corresponding features are referred to by the use of the same reference numerals. The embodiments disclosed herein are exemplary, and not intended to be exhaustive or limiting to the disclosure.

Figure 1B:
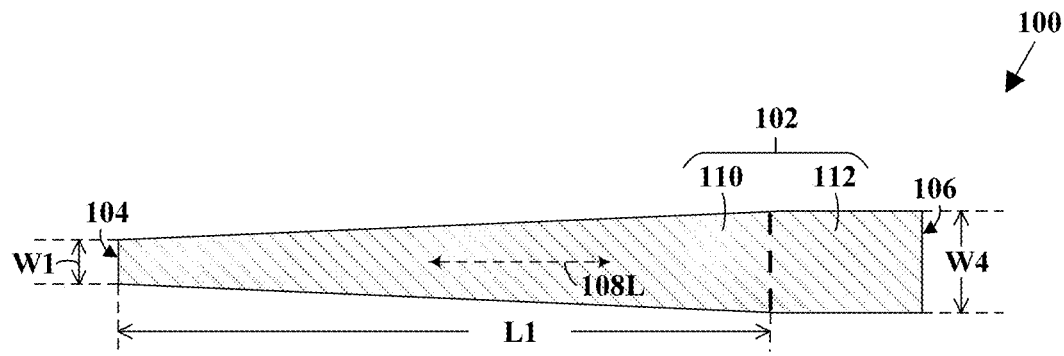
Figure 1C:
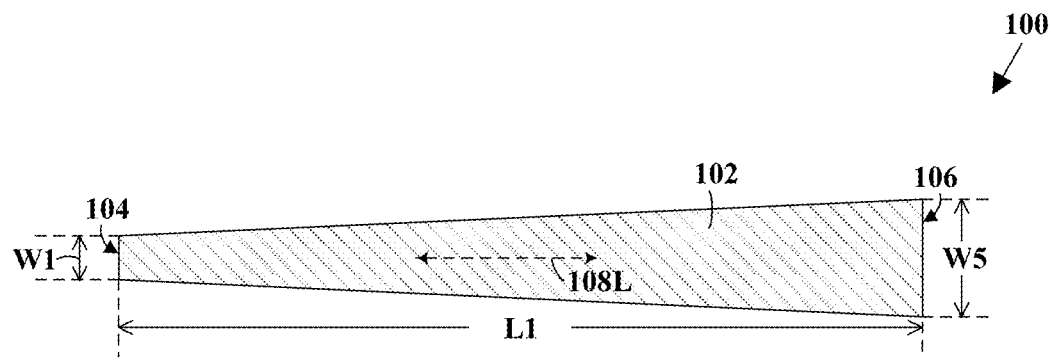

FIGS. 1A through 1C are exemplary top-down views of a stacked edge coupler 100 at an initial fabrication stage of a processing method, according to embodiments of the disclosure. The stacked edge coupler 100 may be used in a photonic chip and may include a waveguide 102.

The waveguide 102 may include an end surface 104 and an end surface 106 arranged laterally opposite the end surface 104. The waveguide 102 has a finite length between the end surfaces 104, 106. In an embodiment of the disclosure, the end surfaces 104, 106 may be substantially planar and may be substantially parallel to each other. In another embodiment of the disclosure, the end surface 104 of the waveguide 102 may serve as an input from a light source, such as a laser or an optical fiber, to the other components in the stacked edge coupler 100.

The waveguide 102 has a longitudinal axis 108L and at least a portion of the waveguide 102 has a width dimension that may vary with position along the longitudinal axis 108L. For example, as illustrated in FIGS. 1A and 1B, the waveguide 102 may include a section 110 and a section 112 arranged laterally adjacent to the section 110. The transition of the section 110 to the section 112 is diagrammatically shown by a dotted line for purposes of illustration. The section 110 and the section 112 may be aligned along their respective lengths with the longitudinal axis 108L of the waveguide 102.

The section 110 may have a width dimension that varies with position along the longitudinal axis 108L. The section 110 may include a minimum width W1 occurring at the end surface 104 and a maximum width W2 occurring at the transition of the section 110 to the section 112, and the section 110 may be tapered (i.e., narrows) in a direction towards the end surface 104. In another example, the width dimension of the section 110 may increase with increasing distance from the end surface 104. In an embodiment of the disclosure, the width dimension of the section 110 may vary along the longitudinal axis 108L based on a linear function to provide a trapezoidal shape. In another embodiment of the disclosure, the width dimension of the section 110 may vary along the longitudinal axis 108L based on a non-linear function, such as a quadratic, parabolic, or exponential function.

Alternatively, as illustrated in FIG. 1C, the waveguide 102 may be tapered over its entire length L1 in a direction towards the end surface 104, such that the width dimension of the waveguide 102 may vary with position along the longitudinal axis 108L.

The section 112 of the waveguide 102 may adopt various geometric configurations. For example, as illustrated in FIG. 1A, the section 112 may have a width dimension that varies with position along the longitudinal axis 108L. The section 112 may have a width W3 occurring at the end surface 106, and the section 112 may be tapered in a direction towards the end surface 106, i.e., the width dimension of the section 112 may increase with increasing distance from the end surface 106. In an embodiment of the disclosure, the width W3 may be wider than the width W1.

Alternatively, as illustrated in FIG. 1B, the section 112 may have a substantially constant width W4 along the longitudinal axis 108L. In an embodiment of the disclosure, the width W4 may be wider than the width W1. In another embodiment of the disclosure, the width W4 of the section 112 may be a maximum width dimension of the waveguide 102.

In other alternative embodiments of the disclosure, the waveguide 102 may further include one or more sections arranged between the section 110 and the section 112. The width dimensions of the one or more sections may be substantially constant or may vary along the longitudinal axis 108L based on a linear function or a non-linear function.

Figure 2A:
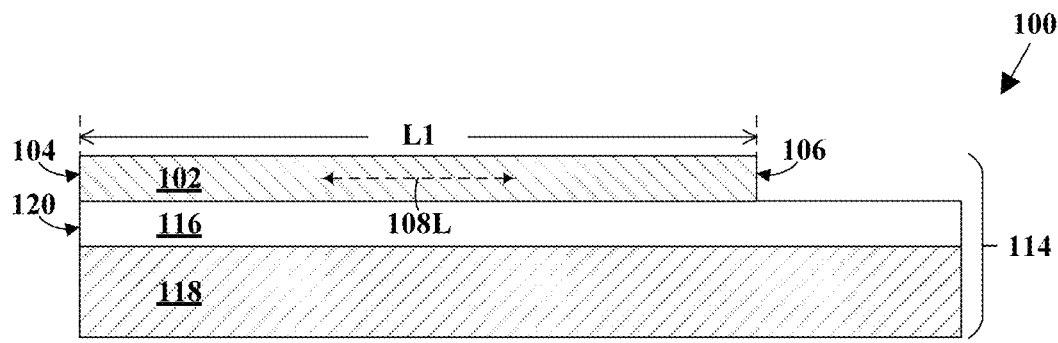
FIG. 2A is a cross-sectional view of the stacked edge coupler taken generally along line 2A-2A in FIG. 1A, and FIGS. 2B and 2C are cross-sectional views of the stacked edge coupler 100 taken generally along line 2B-2B in FIG. 1A, according to embodiments of the disclosure.
Figure 2B:
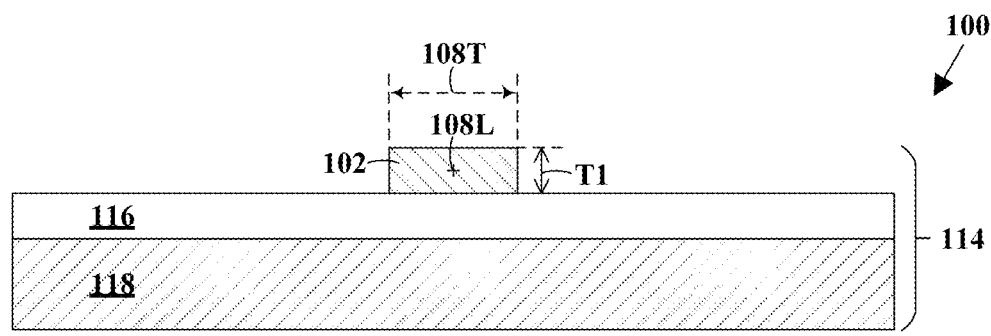
Figure 2C:
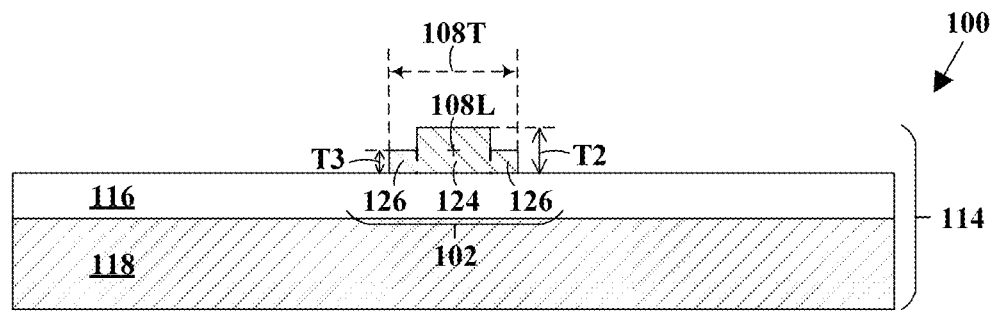

FIG. 2A is a cross-sectional view of the stacked edge coupler 100 taken generally along line 2A-2A in FIG. 1A, and FIGS. 2B and 2C are cross-sectional views of the stacked edge coupler 100 taken generally along line 2B-2B in FIG. 1A, according to embodiments of the disclosure.

The waveguide 102 may include a semiconductor material, for example, silicon, silicon germanium, silicon carbide, or other semiconductor compounds such as II-VI or III-V semiconductor compounds. In an embodiment of the disclosure, the semiconductor material of the waveguide 102 may include a monocrystalline semiconductor material. In another embodiment of the disclosure, the waveguide 102 may originate from a device layer (not shown) of a semiconductor-on-insulator (SOI) substrate 114. The device layer may be where the optical components, including the stacked edge coupler 100, and the electronic components of the photonic chip may be arranged adjacent to, in, and/or above the device layer.

The SOI substrate 114 may further include a buried insulator layer 116 arranged between the device layer and a base substrate 118. The waveguide 102 may be patterned using a patterning technique, including lithography and etching processes, during front-end-of-line processing. Accordingly, the waveguide 102 may be arranged directly on the buried insulator layer 116. In an embodiment of the disclosure, the buried insulator layer 116 may include a dielectric material, such as silicon dioxide.

The buried insulator layer 116 and the base substrate 118 may include a side edge 120 and the end surface 104 of the waveguide 102 may be arranged over the side edge 120 of the buried insulator layer 116. The side edge 120 of the buried insulator layer 116 may be arranged over a side edge of the base substrate, though not necessarily coplanar therewith. In an embodiment of the disclosure, the end surface 104 of the waveguide 102 may be substantially coplanar with the side edge 120 of the buried insulator layer 116.

The waveguide 102 may have a substantially uniform thickness, as illustrated in FIGS. 2A and 2B. For example, the waveguide 102 may have a transverse axis 108T perpendicular to the longitudinal axis 108L and may have a thickness dimension T1 that is substantially constant along the transverse axis 108T. Alternatively, the waveguide 102 may have a thickness dimension that varies with position along the transverse axis 108T, as illustrated in FIG. 2C. For example, the waveguide 102 may include a central portion 124 and a pair of side portions 126 arranged laterally adjacent to the central portion 124. The transition of the central portion 124 to each side portion 126 is diagrammatically shown by a pair of dotted lines for purposes of illustration. The central portion 124 may have a thickness T2 and each side portion 126 may have a substantially equal thickness T3. The thickness T2 of the central portion 124 may be thicker than the thickness T3 of each side portion 126, and the waveguide 102 may acquire an inverted "T-shaped" profile. The waveguide 102 may be formed by partially etching the semiconductor material during the patterning technique to form the central portion 124 and the pair of side portions 126.

Figure 3A:
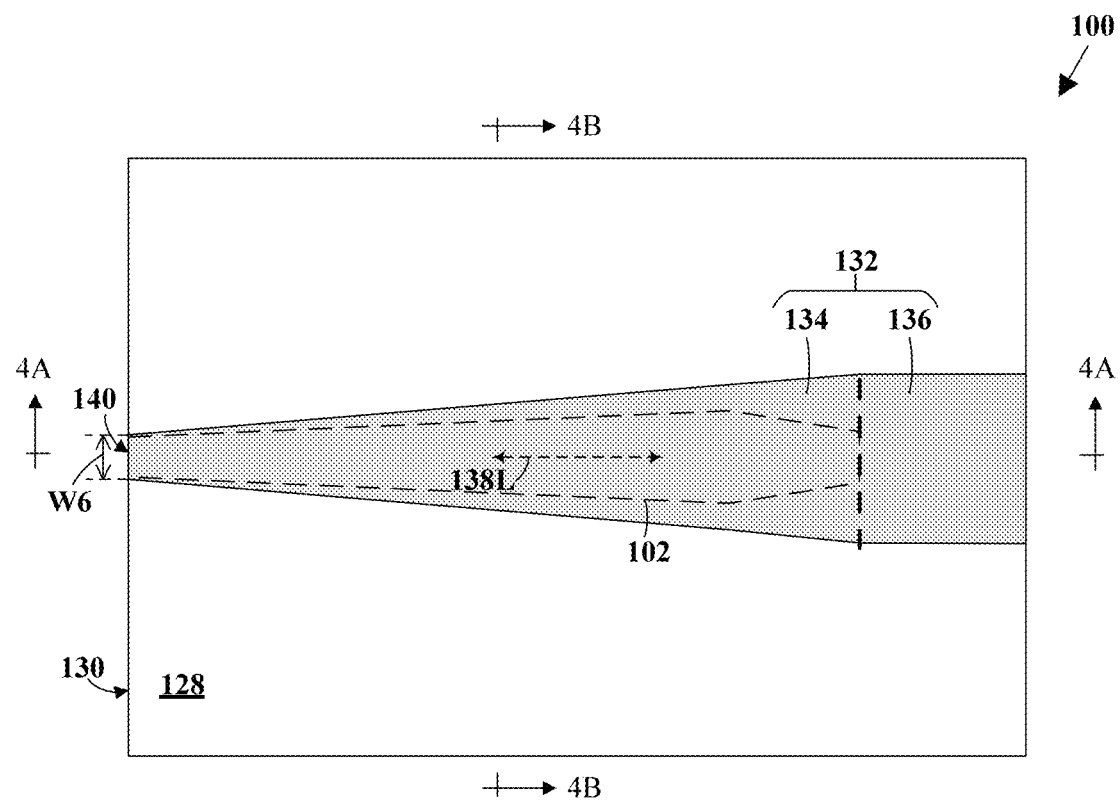
FIGS. 3A and 3B are exemplary top-down views of the stacked edge coupler at a fabrication stage subsequent to FIG. 1A, according to embodiments of the disclosure.
Figure 3B:
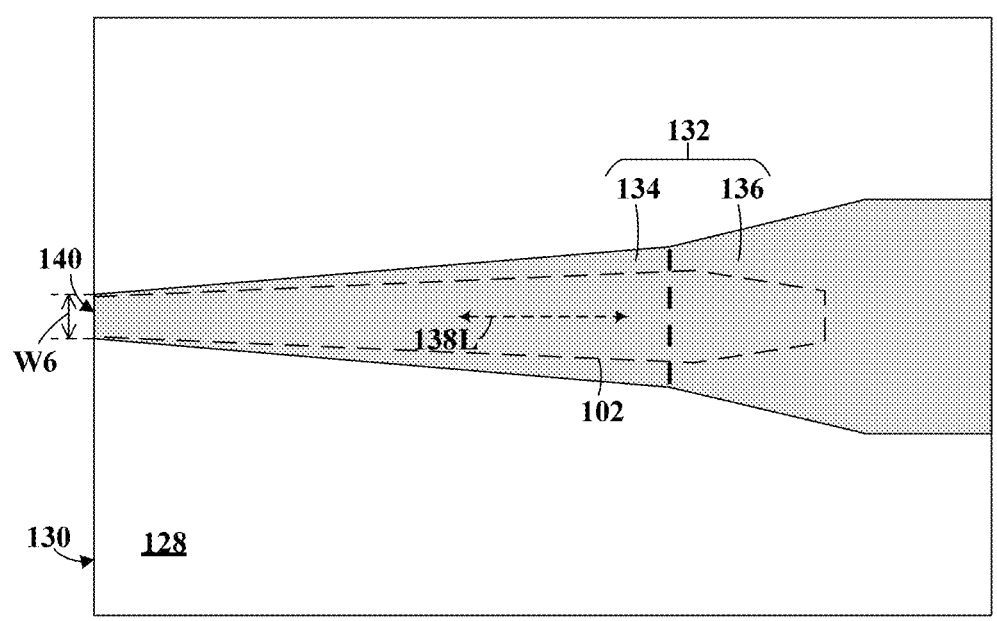
Figure 4A:
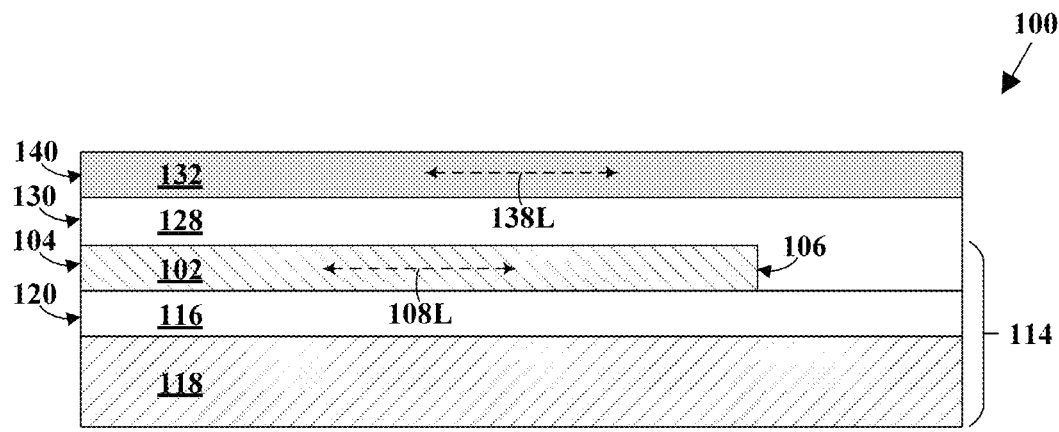
FIGS. 4A and 4B are cross-sectional views of the stacked edge coupler taken generally along respective line 4A-4A and line 4B-4B in FIG. 3A, according to embodiments of the disclosure.
Figure 4B:
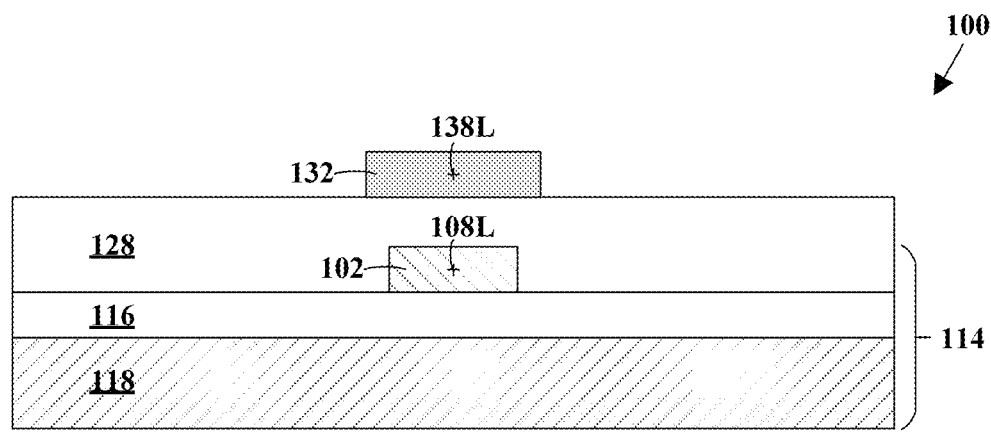

FIGS. 3A and 3B are exemplary top-down views of the stacked edge coupler 100 at a fabrication stage subsequent to FIG. 1A, according to embodiments of the disclosure. FIGS. 4A and 4B are cross-sectional views of the stacked edge coupler 100 taken generally along respective line 4A-4A and line 4B-4B in FIG. 3A, according to embodiments of the disclosure. A dielectric layer 128 may be arranged over the waveguide 102 and the buried insulator layer 116.

The dielectric layer 128 may include a side edge 130, and the side edge 130 of the dielectric layer 128 may be arranged over the side edge 120 of the buried insulator layer 116. In an embodiment of the disclosure, the side edge 130 of the dielectric layer 128 may be substantially coplanar with the side edge 120 of the buried insulator layer 116.

The dielectric layer 128 may include a dielectric material, for example, doped or undoped silicon dioxide. The dielectric layer 128 may be deposited over the waveguide 102 and the buried insulator layer 116 using a deposition technique, including a plasma-enhanced chemical vapor deposition process, during front-end-of-line processing.

A waveguide core 132 may be arranged over the dielectric layer 128 and the waveguide 102; the outline of the waveguide 102 in FIGS. 3A and 3B are diagrammatically shown by dashed lines for purposes of illustration. The waveguide core 132 may have a length longer than the length L1 of the waveguide 102. The waveguide core 132 may connect the stacked edge coupler 100 to other optical components, such as a Mach-Zehnder modulator, and/or electronic components, such as field-effect transistors, for the functioning of the photonic chip.

The waveguide core 132 may include a section 134 and a section 136 arranged laterally adjacent to the section 134. The transition of the section 134 to the section 136 is diagrammatically shown by a dotted line for purposes of illustration. The waveguide core 132 may have a longitudinal axis 138L, and the section 134 and the section 136 may be aligned along their respective lengths with the longitudinal axis 138L. The longitudinal axis 138L may be arranged over the longitudinal axis 108L of the waveguide 102 and may be substantially parallel thereto, as illustrated in FIG. 4A.

The waveguide core 132 may include an end surface 140 that terminates the section 134 of the waveguide core 132. In an embodiment of the disclosure, the end surface 140 may be substantially planar. In another embodiment of the disclosure, the end surface 140 may be substantially coplanar with the end surface 104 of the waveguide 102. In yet another embodiment of the disclosure, the end surface 140 may be substantially coplanar with the side edge 130 of the dielectric layer 128 and the side edge 120 of the buried insulator layer 116.

The waveguide core 132 may be arranged directly above and fully overlap the waveguide 102. For example, as illustrated in FIG. 3A, the section 134 of the waveguide core 132 may fully overlap the entire waveguide 102 such that the section 136 of the waveguide core 132 may be arranged at an offset from the waveguide 102. In another example, as illustrated in FIG. 3B, the section 134 of the waveguide core 132 may overlap a portion of the section 110 of the waveguide 102. Accordingly, the section 136 of the waveguide core 132 may overlap the remaining portion of the waveguide 102.

However, the disclosure is not limited to the above disclosed arrangements of the waveguide core 132 relative to the waveguide 102, and the arrangements may take on other configurations without departing from the spirit and scope of the present disclosure. For example, the section 134 of the waveguide core 132 may overlap the section 110 and a portion of the section 112 of the waveguide 102, while the section 136 of the waveguide core 132 may overlap the remaining portion of the waveguide 102. In another example, the section 134 of the waveguide core 132 may overlap the section 110 of the waveguide 102, while the section 136 of the waveguide core 132 may overlap the section 112 of the waveguide 102.

The section 134 of the waveguide core 132 may have a width dimension that varies with position along the longitudinal axis 138L. For example, the waveguide core 132 may have a minimum width W6 occurring at the end surface 140 such the section 134 may be tapered in a direction towards the end surface 140. In another example, the width dimension of the section 134 may increase with increasing distance from the end surface 140. In an embodiment of the disclosure, the width dimension of the section 134 may vary along the longitudinal axis 138L based on a linear function to provide a trapezoidal shape. In another embodiment of the disclosure, the width dimension of the section 134 may vary along the longitudinal axis 138L based on a non-linear function, such as a quadratic, parabolic, or exponential function. In yet another embodiment of the disclosure, the width W6 of the waveguide core 132 may be at least as wide as the width W1 of the waveguide 102.

The section 136 of the waveguide core 132 may include at least a portion having a substantially constant width dimension with position along the longitudinal axis 138L. For example, a portion of the section 136 having a substantially constant width dimension may be arranged laterally adjacent to and adjoins the section 134, as illustrated in FIG. 3A. In another example, the section 136 may include a tapered portion arranged laterally adjacent to and adjoins the section 134 and a portion having a substantially constant width dimension arranged adjacent to and adjoins a laterally opposite end of the tapered portion from the section 134, as illustrated in FIG. 3B. The tapered portion of the section 136 may be tapered in a direction towards the section 134.

The waveguide core 132 may include a material that has a different material composition from the waveguide 102. For example, the waveguide core 132 may include a material having a lower refractive index than the waveguide 102. In an embodiment of the disclosure, the waveguide core 132 may include a dielectric material, for example, silicon nitride. The waveguide core 132 may be patterned using a patterning technique, including lithography and etching processes, during middle-of-line processing.

The waveguide core 132 may have a substantially uniform and equal thickness with position along the longitudinal axis 138L, as illustrated in FIGS. 4A and 4B. Alternatively, the waveguide core 132 may include portions having different thicknesses. For example, the waveguide core 132 may acquire an inverted "T-shaped" profile across its transverse axis that may be formed by partially etching the dielectric material, to obtain a similar profile as the waveguide 102 illustrated in FIG. 2C.

Figure 5A:
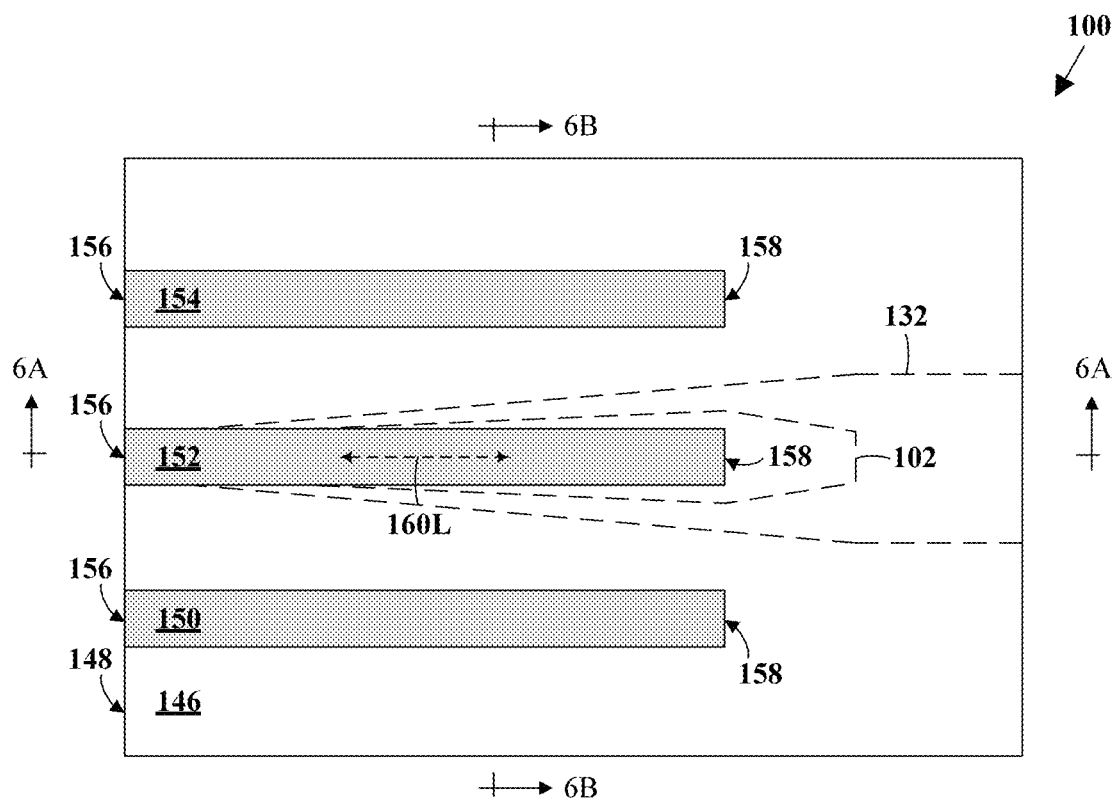
FIGS. 5A and 5B are exemplary top-down views of the stacked edge coupler at a fabrication stage subsequent to FIG. 3A, according to embodiments of the disclosure.
Figure 5B:
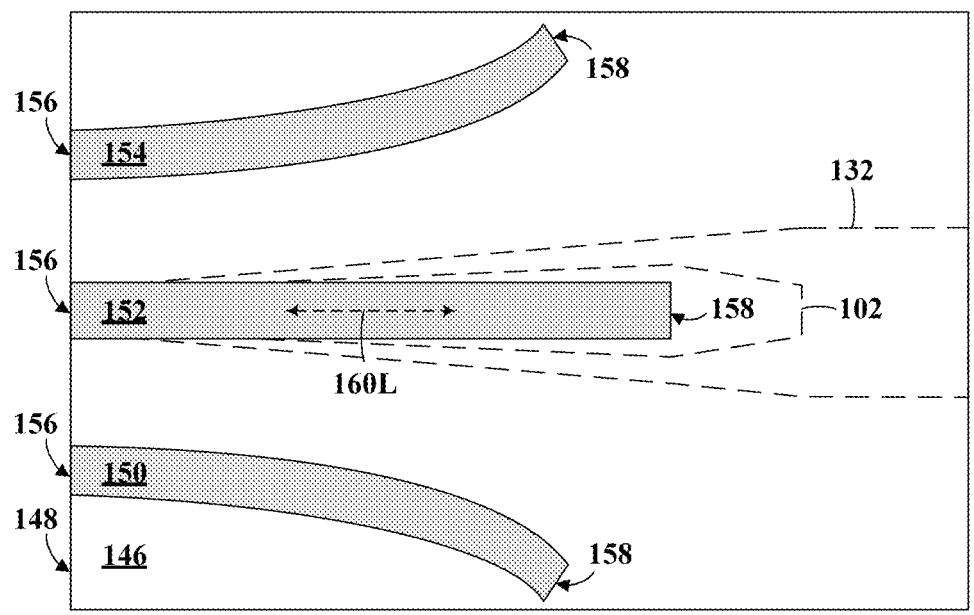
Figure 6A:
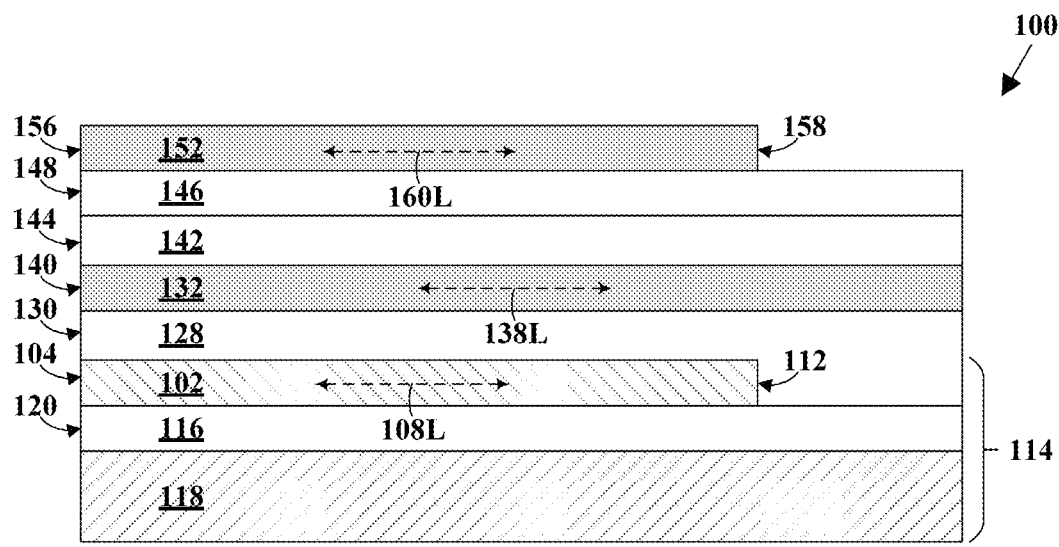
FIGS. 6A and 6B are cross-sectional views of the stacked edge coupler taken generally along respective line 6A-6A and line 6B-6B in FIG. 5A, according to embodiments of the disclosure.
Figure 6B:
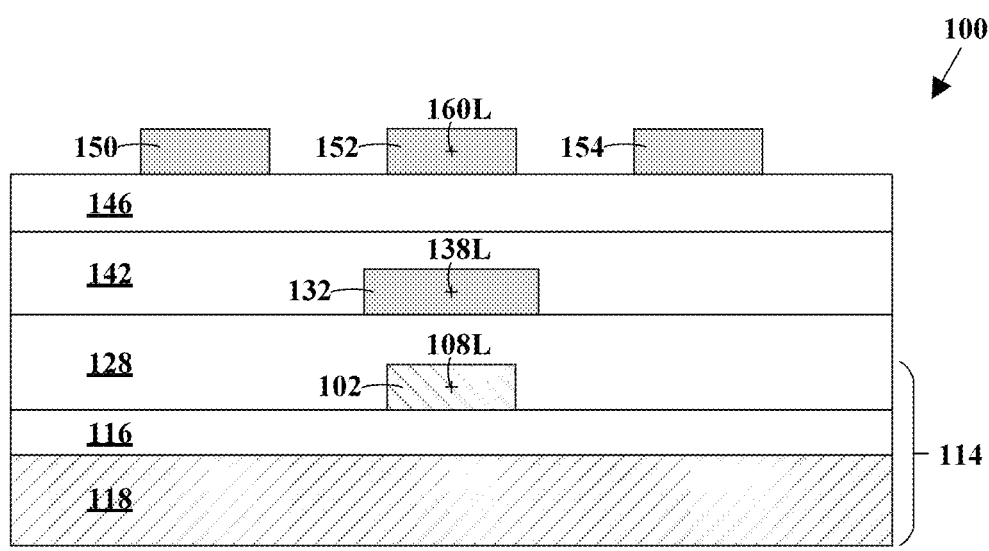

FIGS. 5A and 5B are exemplary top-down views of the stacked edge coupler 100 at a fabrication stage subsequent to FIG. 3A, according to embodiments of the disclosure. FIGS. 6A and 6B are cross-sectional views of the stacked edge coupler 100 taken generally along respective line 6A-6A and line 6B-6B in FIG. 5A, according to embodiments of the disclosure. A dielectric stack 142 may be arranged over the dielectric layer 128 and the waveguide core 132.

The dielectric stack 142 may include a side edge 144. The side edge 144 of the dielectric stack 142 may be further arranged over the end surface 140 of the waveguide core 132, the side edge 130 of the dielectric layer 128, the end surface 104 of the waveguide 102, and the side edge 120 of the buried insulator layer 116. In an embodiment of the disclosure, the side edge 144 of the dielectric stack 142 may be substantially planar. In another embodiment of the disclosure, the side edge 144 of the dielectric stack 142 may be substantially coplanar with the end surface 140 of the waveguide core 132, the side edge 130 of the dielectric layer 128, the end surface 104 of the waveguide 102, and the side edge 120 of the buried insulator layer 116.

The dielectric stack 142 may include one or more layers of dielectric materials, for example, silicon dioxide and/or a dielectric material having a dielectric constant lower than that of silicon dioxide. Examples of dielectric materials having a dielectric constant lower than that of silicon dioxide include carbon-doped silicon dioxide, tetraethyl orthosilicate (TEOS), borophosphosilicate glass (BPSG), or undoped silicate glass (USG). The dielectric stack may also include fluorinated dielectric materials, for example, fluorinated silicon dioxide or fluorinated TEOS. The dielectric stack 142 may further include a semiconductor material, for example, amorphous silicon. The dielectric stack 142 may be deposited using a deposition technique, including a chemical vapor deposition process, during middle-of-line processing.

Another dielectric stack 146 may be arranged over the dielectric stack 142. Similar to the dielectric stack 142, the dielectric stack 146 may include one or more layers of dielectric materials and/or fluorinated dielectric materials, though not necessarily the same materials. In an embodiment of the disclosure, each layer in the dielectric stack 146 may be referred to as an interlayer dielectric layer. The dielectric stack 146 may be deposited using a deposition technique, including a chemical vapor deposition process, during back-end-of-line processing.

The dielectric stack 146 may include a side edge 148. The side edge 148 of the dielectric stack 146 may be further arranged over the side edge 144 of the dielectric stack 142, the end surface 140 of the waveguide core 132, the side edge 130 of the dielectric layer 128, the end surface 104 of the waveguide 102, and the side edge 120 of the buried insulator layer 116. In an embodiment of the disclosure, the side edge 148 of the dielectric stack 146 may be substantially planar. In another embodiment of the disclosure, the side edge 148 of the dielectric stack 146 may be substantially coplanar with the side edge 144 of the dielectric stack 142, the end surface 140 of the waveguide core 132, the side edge 130 of the dielectric layer 128, the end surface 104 of the waveguide 102, and the side edge 120 of the buried insulator layer 116.

In an embodiment of the disclosure, the one or more layers of dielectric materials in the dielectric stacks 142, 146 may have their respective refractive indices, and the refractive indices of the one or more layers of dielectric materials in the dielectric stacks 142, 146 may be lower than the refractive index of the waveguide 102.

Waveguides 150, 152, 154 may be arranged over the dielectric stack 146 on the same level of the stacked edge coupler 100. Each of the waveguides 150, 152, 154 has a finite length and may be terminated by an end surface 156 and an end surface 158 arranged laterally opposite the end surface 156. In an embodiment of the disclosure, the end surfaces 156 of the waveguides 150, 152, 154 may be substantially planar. In another embodiment of the disclosure, the end surfaces 156 of the waveguides 150, 152, 154 may be substantially coplanar with the end surface 140 of the waveguide core 132 and the end surface 104 of the waveguide 102. In yet another embodiment of the disclosure, the end surfaces 156 of the waveguides 150, 152, 154 may be substantially coplanar with the side edge 130 of the dielectric layer 128 and the side edge 120 of the buried insulator layer 116.

The waveguide 152 may be arranged laterally between the waveguide 150 and the waveguide 154. The waveguide 152 may be arranged over and may have an overlapping arrangement with the waveguide core 132; the outlines of the waveguide core 132 in FIGS. 5A and 5B are diagrammatically shown by dashed-dot lines for purposes of illustration. The waveguide 152 may have a longitudinal axis 160L, and the longitudinal axis 160L may be arranged over the longitudinal axis 138L of the waveguide core 132 and may be substantially parallel thereto, as illustrated in FIG. 6A. In an embodiment of the disclosure, the waveguide 152 may have a length shorter than the respective lengths of the waveguide core 132 and the waveguide 102. In another embodiment of the disclosure, the end surface 158 of the waveguide 152 may terminate over the section 134 of the waveguide core 132. The waveguides 150, 154 may be arranged at an offset from the waveguide core 132 such that the waveguides 150, 154 may not overlap the waveguide core 132.

As illustrated in FIG. 5A, the waveguides 150, 152, 154 may have substantially equal lengths and may be arranged substantially parallel to each other. In an embodiment of the disclosure, the end surfaces 158 of the waveguides 150, 152, 154 may be substantially planar. In another embodiment of the disclosure, the end surfaces 158 of the waveguides 150, 152, 154 may be substantially coplanar with each other.

Alternatively, as illustrated in FIG. 5B, the waveguides 150, 154 may be shaped as a bend that curves away from the longitudinal axis 160L of the waveguide 152 along a horizontal plane. For example, a separation between the waveguide 150 and the waveguide 152 may increase with increasing distance from their respective end surfaces 156, and the waveguide 154 may curve away in an opposite direction relative to the waveguide 150. In another example, the waveguides 150, 154 may extend between their respective end surfaces 156, 158 over a curved or curvilinear path, and may have a given curvature over their respective curved arc length. The curvature of the waveguide 150 may be reversed or inverted relative to the curvature of the waveguide 154. Accordingly, the waveguides 150, 154 may trace smooth curves having a continuously-turning tangent at their inner and outer radii over their respective lengths. In an embodiment of the disclosure, the waveguide 150 and the waveguide 154 may be arranged symmetrically relative to the waveguide 152. In another embodiment of the disclosure, the waveguides 150, 152, 154 may have substantially equal lengths.

The waveguides 150, 152, 154 may further have a substantially constant width dimension with position along their respective longitudinal axis, such as the longitudinal axis 160L of the waveguide 152. In an embodiment of the disclosure, each of the waveguides 150, 152, 154 may have a substantially equal width dimension.

The waveguides 150, 152, 154 may include a material that has a similar material composition as the waveguide core 132. For example, the waveguides 150, 152, 154 may include a dielectric material having a substantially similar refractive index as the waveguide core 132. In an embodiment of the disclosure, the waveguides 150, 152, 154 may include silicon nitride. In another embodiment of the disclosure, the waveguides 150, 152, 154 may include nitrogen-doped silicon carbide. In yet another embodiment of the disclosure, the waveguides 150, 152, 154 may include hydrogenated nitrogen-doped silicon carbide. In a further embodiment of the disclosure, the waveguides 150, 152, 154 may include a dielectric material having a refractive index greater than or equal to 1.65 and lower than the refractive index of the waveguide 102.

The waveguides 150, 152, 154 may be deposited using a deposition technique, including a plasma-enhanced chemical vapor deposition process, and subsequently patterned using a patterning technique, including lithography and etching processes, during back-end-of-line processing. In an embodiment of the disclosure, each of the waveguides 150, 152, 154 may have a substantially uniform and equal thickness. Alternatively, the waveguides 150, 152, 154 may include portions having different thicknesses. For example, one or more of the waveguides 150, 152, 154 may acquire an inverted "T-shaped" profile across their respective transverse axes to obtain a similar profile as the waveguide 102 illustrated in FIG. 2C.

Figure 7A:
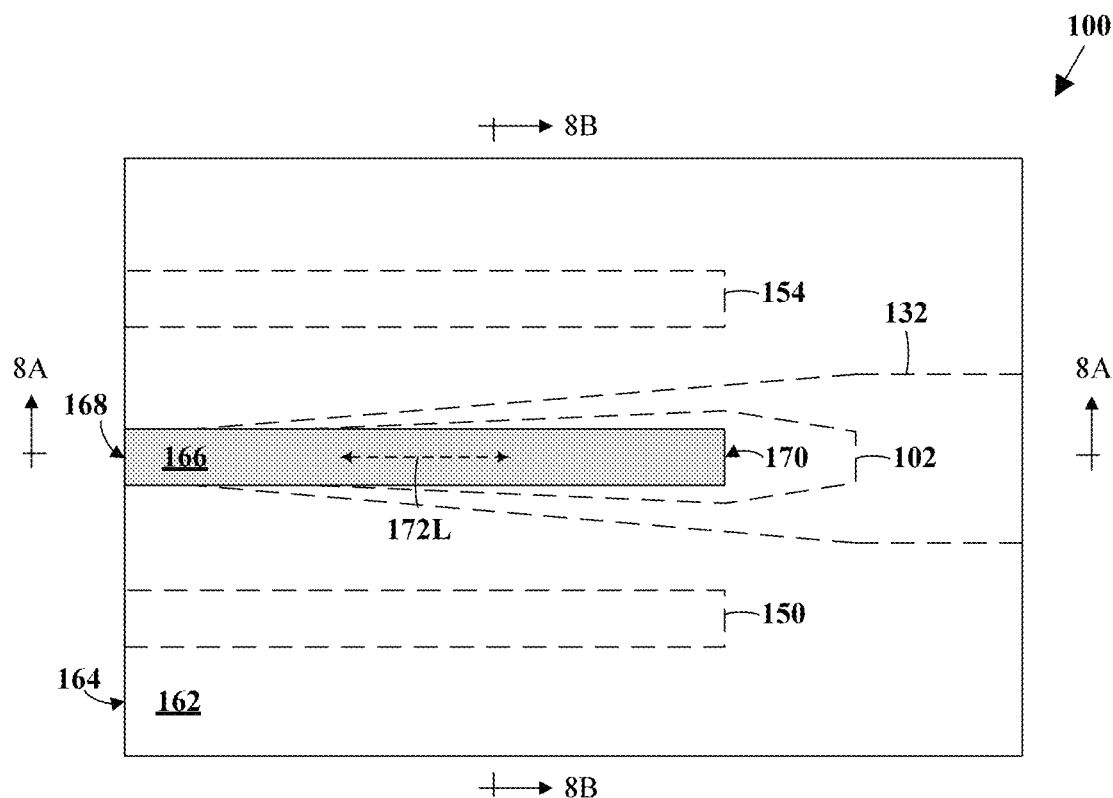
FIGS. 7A. through 7D are exemplary top-down views of the stacked edge coupler at a fabrication stage subsequent to FIG. 5A, according to embodiments of the disclosure.
Figure 8A:
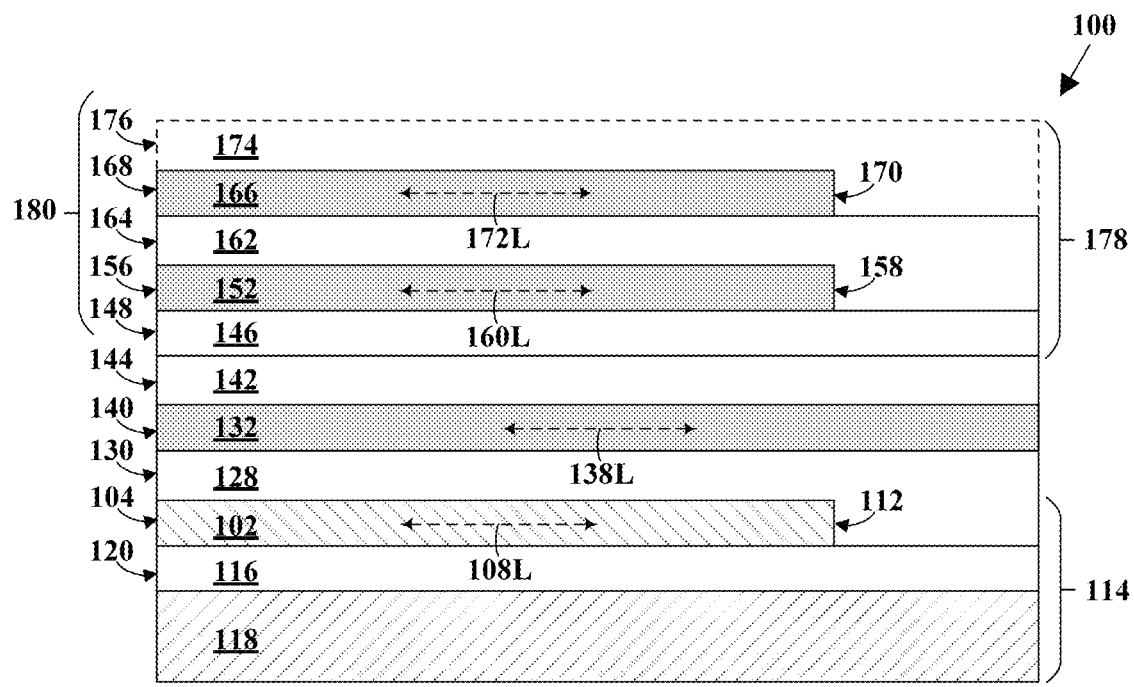
FIGS. 8A and 8B are cross-sectional views of the stacked edge coupler taken generally along respective line 8A-8A and line 8B-8B in FIG. 7A, according to embodiments of the disclosure.
Figure 8B:
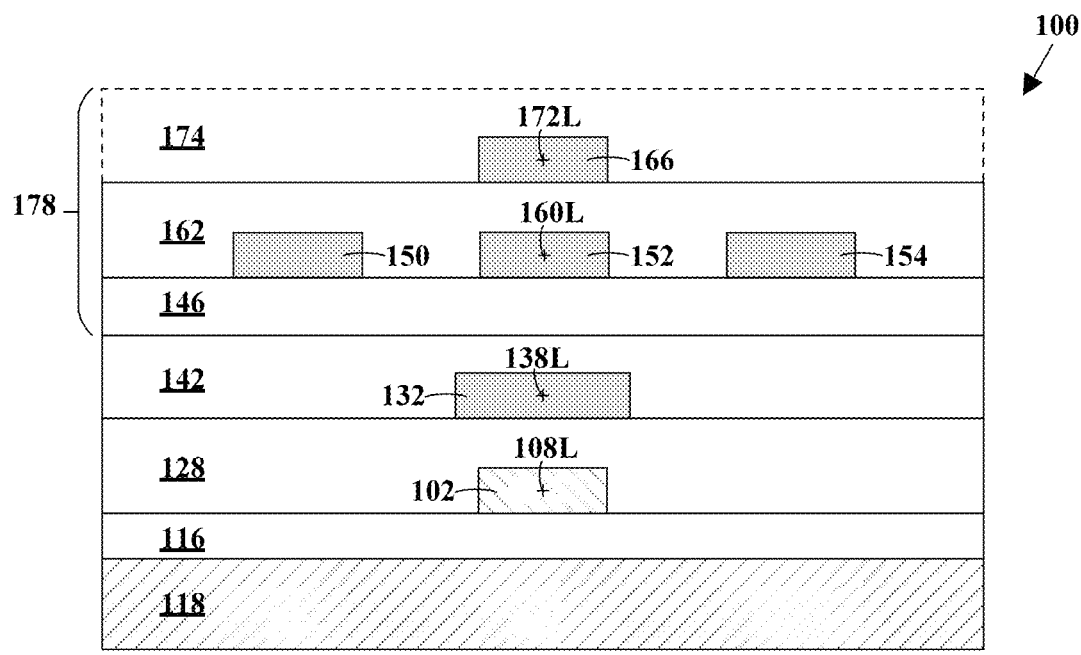

FIGS. 7A. through 7D are exemplary top-down views of the stacked edge coupler 100 at a fabrication stage subsequent to FIG. 5A, according to embodiments of the disclosure. FIGS. 8A and 8B are cross-sectional views of the stacked edge coupler 100 taken generally along respective line 8A-8A and line 8B-8B in FIG. 7A, according to embodiments of the disclosure. A dielectric layer 162 may be arranged over the dielectric stack 146 and the waveguides 150, 152, 154.

The dielectric layer 162 may include a side edge 164, and the side edge 164 may be arranged over the side edge 120 of the buried insulator layer 116. In an embodiment of the disclosure, the side edge 164 of the dielectric layer 162 may be substantially coplanar with the side edge 130 of the dielectric layer 128 and the side edge 120 of the buried insulator layer 116.

The dielectric layer 162 may include a dielectric material, for example, silicon dioxide or a dielectric material having a dielectric constant lower than that of silicon dioxide. The dielectric layer 162 may be deposited using a deposition technique, including a plasma-enhanced chemical vapor deposition process, during back-end-of-line processing.

Figure 7B:
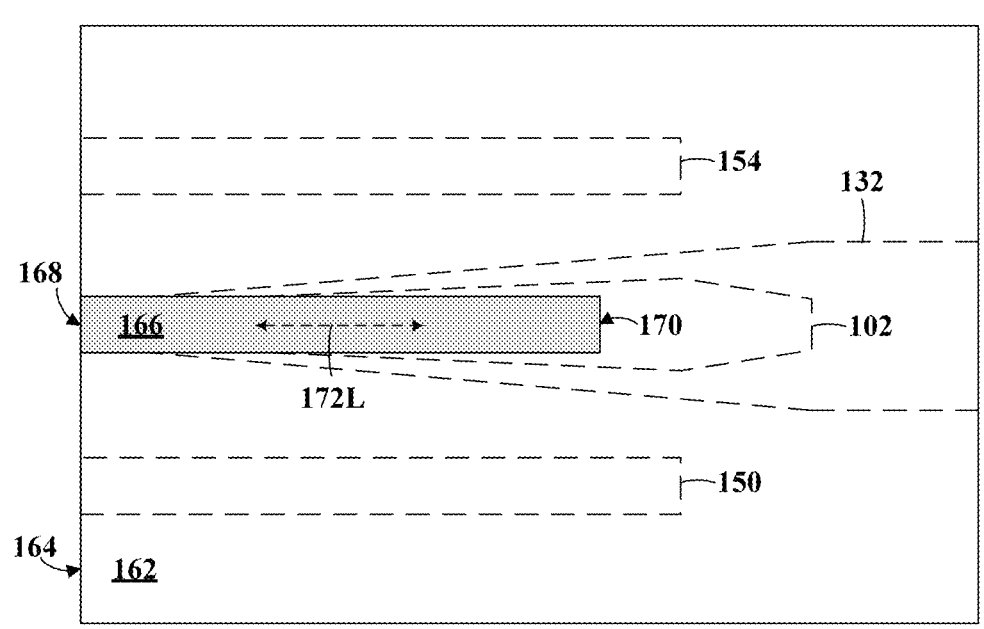

At least one waveguide 166 may be arranged over the dielectric layer 162. For example, as illustrated in FIGS. 7A and 7B, one waveguide 166 may be arranged over the dielectric layer 162. The waveguide 166 has a finite length and may be terminated by an end surface 168 and an end surface 170 arranged laterally opposite the end surface 168. In an embodiment of the disclosure, the end surfaces 168, 170 of the waveguide 166 may be substantially planar and may be substantially parallel to each other. In another embodiment of the disclosure, the end surface 168 of the waveguide 166 may be substantially coplanar with the end surface 104 of the waveguide 102 and the end surface 140 of the waveguide core 132. In another embodiment of the disclosure, the end surface 168 of the waveguide 166 may be substantially coplanar the side edge 130 of the dielectric layer 128 and the side edge 120 of the buried insulator layer 116.

The waveguide 166 may be further arranged over and may have an overlapping arrangement with the waveguide core 132; the outlines of the waveguide core 132 and the waveguide 102 are diagrammatically shown by dashed-dot lines and dashed lines, respectively, in FIGS. 7A through 7D for purposes of illustration. For example, the waveguide 166 may have a longitudinal axis 172L, and the longitudinal axis 172L may be arranged over the longitudinal axis 160L of the waveguide 152 and may be substantially parallel thereto, as illustrated in FIG. 8A. The waveguide 166 may have a length no longer than the length L1 of the waveguide 102, for example, the waveguide 166 may have a length substantially equal to the length of the section 110 of the waveguide 102, as illustrated in FIGS. 7A and 8A. Alternatively, the waveguide 166 may have a length shorter than the length of the section 110 of the waveguide 102, as illustrated in FIG. 7B.

Figure 7C:
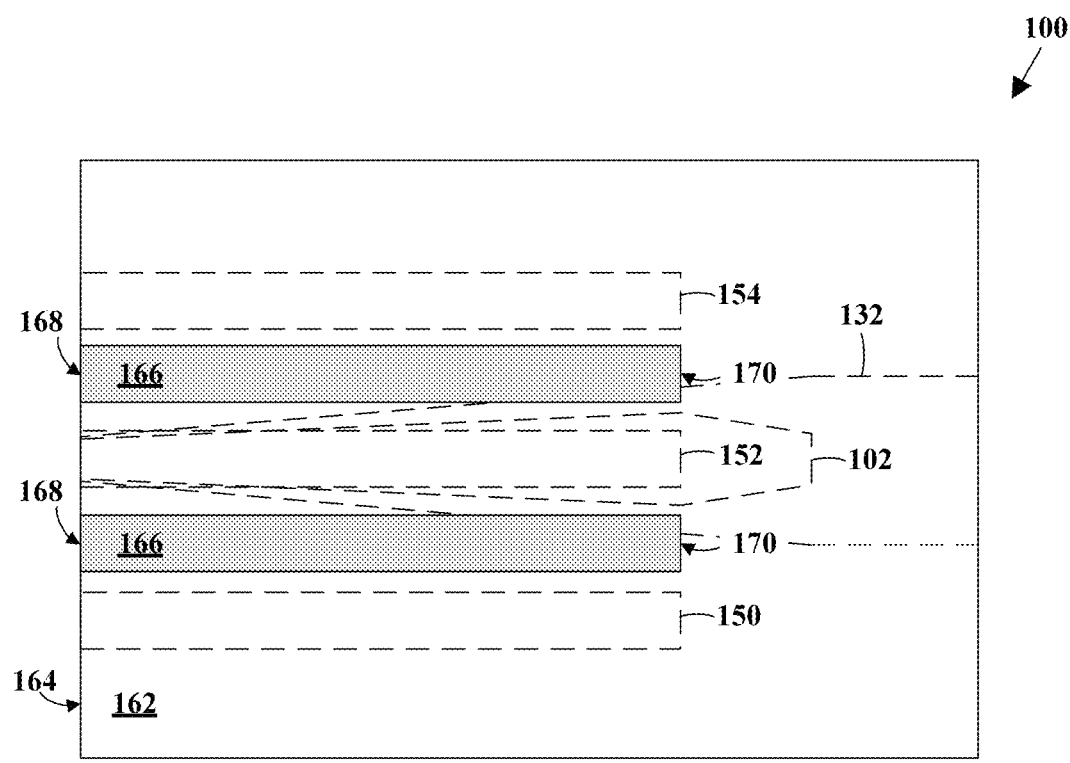
Figure 7D:
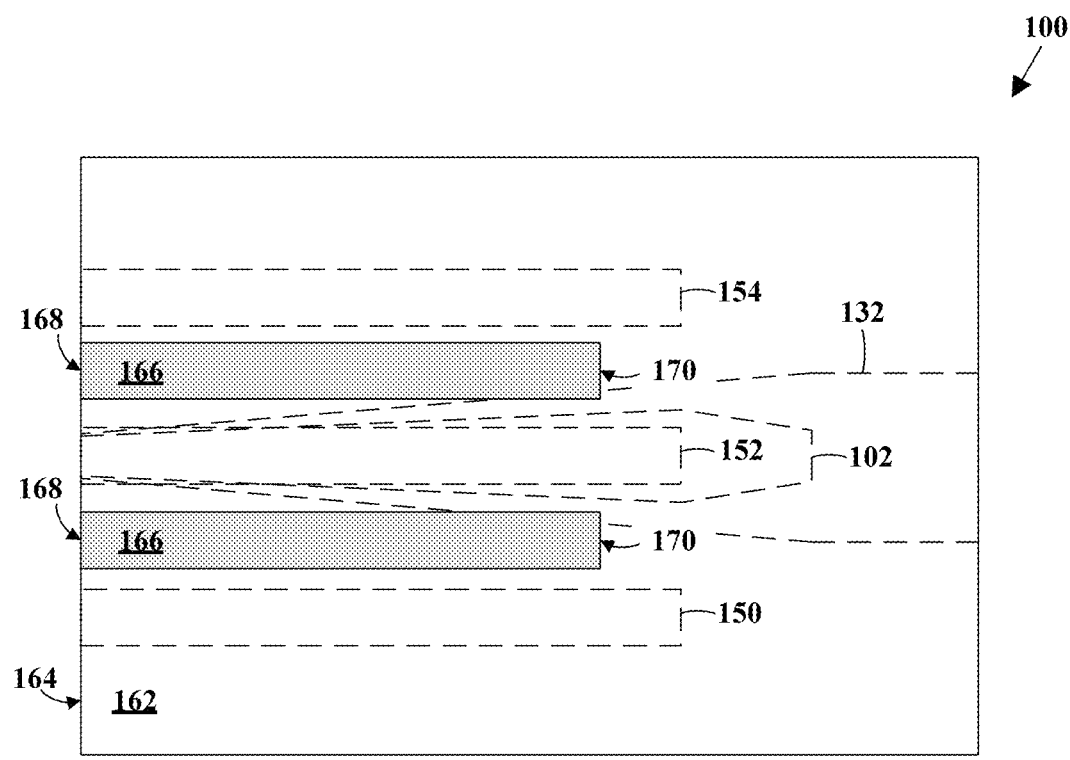

In another example, more than one waveguide 166 may be arranged over the dielectric layer 162, such as a pair of waveguides 166 as illustrated in FIGS. 7C and 7D. At least one of the pair of waveguides 166 may have an overlapping arrangement with the waveguide core 132. Each waveguide 166 has a finite length and may be terminated by an end surface 168 and an end surface 170 arranged laterally opposite the end surface 168. In an embodiment of the disclosure, the end surfaces 168, 170 of each waveguide 166 may be substantially planar and may be substantially parallel to each other. In another embodiment of the disclosure, the end surface 168 of each waveguide 166 may be substantially coplanar with the end surface 140 of the waveguide core 132 and the end surface 120 of the waveguide 102. In another embodiment of the disclosure, the end surfaces 168 of each waveguide 166 may be substantially coplanar with the side edge 130 of the dielectric layer 128 and the side edge 120 of the buried insulator layer 116.

The pair of waveguides 166 may be arranged at an offset over the waveguides 150, 152, 154, such that one waveguide 166 of the pair of waveguides 166 may be arranged over and between the waveguides 150, 152, and the other waveguide 166 of the pair of waveguides 166 may be arranged over and between the waveguides 152, 154. The pair of waveguides 166 may have substantially similar lengths. In an embodiment of the disclosure, the pair of waveguides 166 may be arranged substantially parallel to each other. Alternatively, the waveguides 166 may be shaped as a bend, similar to the waveguides 150, 154 in FIG. 5B.

Each waveguide 166 may have a length no longer than the length L1 of the waveguide 102. For example, each waveguide 166 may have a length at most as long as the length of the section 110 of the waveguide 102. Alternatively, each waveguide 166 may have a length shorter than the length of the section 110 of the waveguide 102, as illustrated in FIG. 7D.

The waveguide 166 may include a material that has a similar material composition as the waveguide core 132 and the waveguides 150, 152, 154. For example, the waveguide 166 may include a dielectric material having a substantially similar refractive index as the waveguide core 132 and the waveguides 150, 152, 154. In an embodiment of the disclosure, the waveguide 166 may include silicon nitride. In another embodiment of the disclosure, the waveguide 166 may include nitrogen-doped silicon carbide. In yet another embodiment of the disclosure, the waveguide 166 may include hydrogenated nitrogen-doped silicon carbide. In a further embodiment of the disclosure, the waveguide 166 may include a dielectric material having a refractive index greater than or equal to 1.65 and lower than the refractive index of the waveguide 102. The waveguide 166 may be deposited using a deposition technique, including a plasma-enhanced chemical vapor deposition process, and subsequently patterned using a patterning technique, including lithography and etching processes, during back-end-of-line processing.

Processing continues with the formation of an additional dielectric layer 174 over the dielectric layer 162 and the waveguide 166. The dielectric layer 174 may include a side edge 176 that may be substantially coplanar with the side edge 120 of the buried insulator layer 116, the end surface 104 of the waveguide 102, and the end surface 140 of the waveguide core 132.

As presented in the above disclosure, stacked edge couplers and methods of forming the same are presented. The stacked edge couplers may include an array of waveguides arranged in the front-end-of-line region, the middle-of-line region, and the back-end-of-line region of a photonic chip.

For example, the waveguide 102 may be arranged in the front-end-of-line region and the waveguide core 132 may be arranged in the middle-of-line region. The waveguides 150, 152, 154, 166 may be arranged in the back-end-of-line region and form part of a back-end-of-line stack 178. The respective end surfaces 104, 156, 168 of the waveguides 102, 150, 152, 154, 166 and the end surface 140 of the waveguide core 132 may be substantially coplanar with each other to form a side edge 180 of the back-end-of-line stack 178. The side edges 148, 164, 176 of the dielectric stack 146, the dielectric layer 162, and the dielectric layer 174 may also form part of the side edge 180 and may be substantially coplanar with the end surfaces 104, 156, 168 of the waveguides 102, 150, 152, 154 166 and the end surface 140 of the waveguide core 132.

One or more layers of dielectric materials, for example, a moisture barrier layer, may be optionally arranged adjacent to the side edge 180 of the back-end-of-line stack 178. The one or more dielectric layers may further extend to be arranged adjacent to the waveguide 102 and the waveguide core 132.

During an assembly phase, a light source, for example, an optical fiber may be laterally arranged adjacent to the side edge 180 of the back-end-of-line stack 178 of the stacked edge coupler 100. Due to the placements of the waveguides 150, 152, 154, 166 in the back-end-of-line stack 178, the optical fiber may be arranged adjacent to the side edge 180 and the optical fiber may be placed over the base substrate 118 or in a groove or an opening formed in the base substrate 118.

The array of waveguides 102, 150, 152, 154, 166 surrounding the waveguide core 132 may promote coupling of the optical signals to the waveguide core 132 and effectively minimize optical signal losses due to leakage through the SOI substrate 114. For example, the waveguides 102, 150, 152, 154, 166 may function as assisting waveguides to promote efficient coupling of optical signals from the optical fiber to the waveguide core 132. Additionally, the waveguide 102 may minimize optical signal losses through the base substrate 118 by shielding the optical signals therefrom.

The array of waveguides 150, 152, 154, 166, along with the dielectric stack 146, the dielectric layer 162, and the dielectric layer 174, in the different levels of the back-end-of-line stack 178 arranged substantially coplanar to their respective end surfaces 156, 168 and their respective side edges 148, 164, 176 may minimize diffraction or reflection light at the wavelength of operation, and therefore, act as an effective optical material and form a metamaterial.

The terms "top", "bottom", "over", "under", and the like in the description and the claims, if any, are used for descriptive purposes and not necessarily for describing permanent relative positions. It is to be understood that the terms so used are interchangeable under appropriate circumstances such that the embodiments of the devices described herein are, for example, capable of operation in other orientations than those illustrated or otherwise described herein.

Additionally, the formation of a first feature over or on a second feature in the description that follows may include embodiments in which the first and second features are formed in direct contact, and may also include embodiments in which additional features may be formed interposing the first and second features, such that the first and second features may not be in direct contact.

Similarly, if a method is described herein as involving a series of steps, the order of such steps as presented herein is not necessarily the only order in which such steps may be performed, and certain of the stated steps may possibly be omitted and/or certain other steps not described herein may possibly be added to the method. Furthermore, the terms "comprise", "include", "have", and any variations thereof, are intended to cover a non-exclusive inclusion, such that a process, method, article, or device that comprises a list of features is not necessarily limited to those features but may include other features not expressly listed or inherent to such process, method, article, or device. Occurrences of the phrase "in an embodiment" herein do not necessarily all refer to the same embodiment.

In addition, unless otherwise indicated, all numbers expressing quantities, ratios, and numerical properties of materials, reaction conditions, and so forth used in the specification and claims are to be understood as being modified in all instances by the term "about".

Furthermore, approximating language, as used herein throughout the specification and claims, may be applied to modify any quantitative representation that could permissibly vary without resulting in a change in the basic function to which it is related. Accordingly, a value modified by a term or terms, such as "approximately", "about,", "substantially" is not limited to the precise value specified. In some instances, the approximating language may correspond to the precision of an instrument for measuring the value. In other instances, the approximating language may correspond to within normal tolerances of the semiconductor industry. For example, "substantially coplanar" means substantially in a same plane within normal tolerances of the semiconductor industry, and "substantially perpendicular" means at an angle of 90 degrees plus or minus a normal tolerance of the semiconductor industry.

While several exemplary embodiments have been presented in the above detailed description of the device, it should be appreciated that a number of variations exist. It should further be appreciated that the embodiments are only examples, and are not intended to limit the scope, applicability, dimensions, or configuration of the device in any way. Rather, the above detailed description will provide those skilled in the art with a convenient road map for implementing an exemplary embodiment of the device, it being understood that various changes may be made in the function and arrangement of features and methods of fabrication described in an exemplary embodiment without departing from the scope of this disclosure as set forth in the appended claims.

What is claimed is:

1. A stacked edge coupler, comprising:
    an insulator layer;
    a first assisting waveguide on the insulator layer, the first assisting waveguide comprises an end surface;
    a waveguide core over the first assisting waveguide, the waveguide core comprising a tapered section having an end surface, and the end surface of the tapered section of the waveguide core is substantially coplanar with the end surface of the first assisting waveguide; and
a back-end-of-line stack over the waveguide core, the back-end-of-line stack comprises:
- a side edge;
- a dielectric layer; and
- a second assisting waveguide on the dielectric layer adjacent to the side edge, and the second assisting waveguide has an overlapping arrangement with the tapered section of the waveguide core.

2. The stacked edge coupler of claim 1, wherein the waveguide core has a lower refractive index than the first assisting waveguide.

3. The stacked edge coupler of claim 1, wherein the first assisting waveguide comprises an end surface and the insulator layer comprises a side edge, and the side edge of the insulator layer is substantially coplanar with the end surface of the first assisting waveguide.

4. The stacked edge coupler of claim 1, wherein the first assisting waveguide comprises an end surface, and the end surface of the first assisting waveguide is substantially coplanar with the side edge of the back-end-of-line stack.

5. The stacked edge coupler of claim 1, wherein the first assisting waveguide comprises a first section, and the first section of the first assisting waveguide is tapered towards to and terminates at the end surface of the first assisting waveguide.

6. The stacked edge coupler of claim 5, wherein the first assisting waveguide comprises a longitudinal axis, and further comprises a second section arranged laterally adjacent to the first section and extends along the longitudinal axis of the first assisting waveguide.

7. The stacked edge coupler of claim 1, wherein the first assisting waveguide comprises a transverse axis, and the first assisting waveguide has a thickness dimension that varies with position along the transverse axis.

8. The stacked edge coupler of claim 1, wherein the first assisting waveguide comprises a monocrystalline semiconductor material.

9. A stacked edge coupler, comprising:
an insulator layer having a side edge;
a first assisting waveguide on the insulator layer, the first assisting waveguide comprises a tapered section having an end surface and the end surface is substantially coplanar with the side edge of the insulator layer;
a waveguide core over the first assisting waveguide, the waveguide core comprising a tapered section having a side edge and the side edge of the tapered section is over the end surface of the first assisting waveguide; and
a back-end-of-line stack over the waveguide core, the back-end-of-line stack comprises:
- a side edge;
- a dielectric layer;
- a second assisting waveguide;
- a third assisting waveguide; and
- a fourth assisting waveguide arranged laterally between the second assisting waveguide and the third assisting waveguide, the second assisting waveguide, the third assisting waveguide, and the fourth assisting waveguide arranged on the dielectric layer adjacent to the side edge, and the fourth assisting waveguide having an overlapping arrangement with the tapered section of the waveguide core.

10. The stacked edge coupler of claim 9, wherein the second assisting waveguide has an end surface adjacent to the side edge of the back-end-of-line stack, the third assisting waveguide has an end surface adjacent to the side edge of the back-end-of-line stack, the fourth assisting waveguide has an end surface adjacent to the back-end-of-line stack, and the end surfaces of the second assisting waveguide, the third assisting waveguide, and the fourth assisting waveguide are substantially coplanar with the side edge of the insulator layer.

11. The stacked edge coupler of claim 9, wherein the first assisting waveguide has a length, and the waveguide core has a length longer than the length of the first assisting waveguide.

12. The stacked edge coupler of claim 9, wherein the first assisting waveguide has a length, the fourth assisting waveguide has a length no longer than the length of the first assisting waveguide.

13. The stacked edge coupler of claim 9, wherein the second assisting waveguide and the third assisting waveguide are offset over the first assisting waveguide.

14. The stacked edge coupler of claim 9, wherein the waveguide core, the first assisting waveguide, the second assisting waveguide, the third assisting waveguide, and the fourth assisting waveguide have refractive indices, and the refractive index of the first assisting waveguide is higher than the respective refractive indices of the second assisting waveguide, the third assisting waveguide, and the fourth assisting waveguide.

15. The stacked edge coupler of claim 9, further comprising a base substrate, and the insulator layer and the base substrate are part of a semiconductor-on-insulator substrate.

16. The stacked edge coupler of claim 15, wherein the first assisting waveguide is a portion of a device layer of the semiconductor-on-insulator substrate.

17. A method of forming a stacked edge coupler, comprising:
forming a first assisting waveguide on an insulator layer, the first assisting waveguide comprises an end surface;
forming a waveguide core over the first assisting waveguide, the waveguide core comprises a tapered section having an end surface, and the end surface of the tapered section of the waveguide core is substantially coplanar with the end surface of the first assisting waveguide; and
forming a back-end-of-line stack over the waveguide core, the back-end-of-line stack comprises:
- a side edge;
- a dielectric layer; and
- a second assisting waveguide formed on the dielectric layer adjacent to the side edge, and the second assisting waveguide has an overlapping arrangement with the tapered section of the waveguide core.

18. The method of claim 17, further comprises patterning a device layer of a semiconductor-on-insulator substrate to form the first assisting waveguide.

19. The method of claim 17, wherein forming the waveguide core comprises:
depositing a dielectric material; and
patterning the dielectric material by middle-of-line processing.

* * * * *